United States Patent Office 3,838,056
Patented Sept. 24, 1974

3,838,056
ELECTRICAL DEVICES CONTAINING
DIELECTRIC FLUID
Gary A. Vincent, Midland, Mich., assignor to Dow
Corning Corporation, Midland, Mich.
No Drawing. Filed Nov. 2, 1972, Ser. No. 303,191
Int. Cl. H01b 31/46
U.S. Cl. 252—64                                    16 Claims

ABSTRACT OF THE DISCLOSURE

Improved electrical devices, such as transformers and capacitors, containing monochloroalkylsiloxanes as dielectric fluids are disclosed.

In numerous electrical devices it is necessary to provide a liquid insulating medium which is called a "dielectric fluid." This liquid has a substantially higher breakdown strength than air and, by displacing air from spaces between conductors in the electrical equipment or apparatus, materially raises the breakdown voltage of the electrical device.

Various liquids, including some siloxanes, have been suggested for use as dielectric fluids. See for example U.S. Pat. 2,377,689 and British Pats. 899,658 and 899,661. Commonly used dielectric fluids at the present time are the polychlorinated biphenyl compounds (generally known as "PCB's"). The PCB's have lost favor in the sight of the environmentalists and, be they right or wrong, efforts are being made to find suitable replacements for the PCB's. Also, with the recent advances in the field of electrical devices, the standards applicable to dielectric fluids have become more severe thus spurring the search for improved materials.

While the ideal characteristics of a modern day dielectric fluid will obviously vary with the specific application, generally speaking the following properties would be considered desirable. The dielectric fluid should have a controlled dielectric constant which does not vary with varying frequency. The fluid should have a high dielectric strength, preferably greater than 300 volts per mil. It should have a high volume resistivity, preferably greater than $10^{10}$ ohms. And it should have a low dissipation factor, preferably less than 0.005.

It has been found quite unexpectedly that improved electrical devices, such as transformers and capacitors, can be produced by employing monochloroalkylsiloxanes as dielectric fluids therein.

More specifically, this invention relates to an electrical device containing a dielectric fluid wherein the improvement comprises employing as the dielectric fluid a siloxane which consists essentially of from 1 to 100 mole percent $$R_nR'_mSiO_{\frac{4-(m+n)}{2}}$$

siloxane units wherein $n$ has an average value of from 1 to 3, $m$ has an average value of from 0 to 2, the sum of $m+n$ being from 1 to 3, R is a monochloroalkyl radical containing from 3 to 6 carbon atoms, and R' is an alkyl radical containing from 1 to 12 carbon atoms, and from 0 to 99 mole percent $$R''_xSiO_{\frac{4-x}{2}}$$

siloxane units wherein $x$ has an average value of from 0 to 3, and R" is an alkyl radical containing from 1 to 12 carbon atoms.

As indicated above, the dielectric fluid can contain anywhere from 1 to 100 mole percent of siloxane units of the formula $$R_nR'_mSiO_{\frac{4-(m+n)}{2}}$$

Thus the dielectric fluid can be composed of $RSiO_{3/2}$, $R_2SiO$, $R_3SiO_{1/2}$, $RR'SiO$, $RR'_2SiO_{1/2}$ or $R_2R'SiO_{1/2}$ units.

The R radical in the above siloxane units can be any monochloroalkyl radical containing from 3 to 6 carbon atoms so long as there are at least three carbon atoms between the chlorine atom and the silicon atom. Specific examples of R radicals include, —CH$_2$CH$_2$CH$_2$Cl, —CH$_2$CH$_2$CH$_2$CH$_2$Cl, —CH$_2$CH(CH$_3$)CH$_2$Cl, —CH$_2$CH$_2$CH$_2$CH$_2$CH$_2$Cl, —CH$_2$CH$_2$CH$_2$CH$_2$CH$_2$CH$_2$Cl and the —CH$_2$CH$_2$CH$_2$CHClCH$_3$ radicals. It is preferred that the chlorine atom be in the terminal position. The radicals containing 3 or 4 carbon atoms are preferred with the chloropropyl radical being most preferred at this time.

It was quite unexpected to find that this small group of monochloroalkylsiloxanes were useful as dielectric fluids in view of the fact that the —CH$_2$CH$_2$Cl containing siloxanes are very unstable both thermally and hydrolytically. As the number of carbon atoms increases the effect of the chlorine atom tends to become obscured. It has also been found that the polychlorinated alkyl siloxanes, i.e., —CH$_2$CH$_2$CCl$_3$, are thermally unstable and therefore not useful as dielectric fluids. Likewise, the brominated alkyl siloxanes are relatively hydrolytically unstable. And the chlorinated aryl siloxanes are potentially subject to the same criticisms as the PCB's.

The R' radical in the above siloxane units can be an alkyl radical containing from 1 to 12 carbon atoms. Thus R' can be, for example, a methyl, ethyl, propyl, isopropyl, butyl, isobutyl, t-butyl, amyl, hexyl, octyl, decyl or dodecyl radical. It is preferred that R' be an alkyl radical containing from 1 to 6 carbon atoms, with the methyl radical being the most preferred group.

The dielectric fluids can be composed entirely of the above siloxanes units or combinations thereof with siloxane units of the formula $$R''_xSiO_{\frac{4-x}{2}}$$

In these latter units R" can be any alkyl radical containing from 1 to 12 carbon atoms. The same illustrations and preferences with regard to R' set forth above are applicable to R". Illustrative of the type of units within the scope of the foregoing general formula are the $R_3''SiO_{1/2}$, $R_2''SiO$, $R''SiO_{3/2}$ and $SiO_{4/2}$ units.

The siloxanes useful as dielectric fluids in accordance with the instant invention can be prepared by techniques well known to those skilled in the art and hence will not be described here. It is noted, however, that one of the significant aspects of this invention is that by control of the amount and kind of monochloroalkyl siloxane units in the di-electric fluid during preparation, one can tailor the final product to more nearly meet the specific needs of any particular intended use. This will be illustrated later herein.

The two most important electrical devices in which the dielectric fluid during preparation, one can tailor the final formers and capacitors. They are also very useful dielectric fluids in other electrical devices such as electrical cables, rectifiers, electromagnets, switches, fuses, circuit breakers, and as coolants and insulators for dielectric devices such as transmitters, receivers, fly-back coils, sonar buoys, toys and military "block boxes." The method for employing dielectric fluids in these various applications (be they for example as a reservoir of liquid or as an impregnant) are well known to those skilled in the art. For best results the viscosity of the dielectric fluids of this invention should be in the range of 5 to 500 cs. If the viscosity exceeds 500 cs. they are difficult to use as impregnants, and at less than 5 cs. their volatility becomes a problem unless they are used in a closed system.

Now in order that those skilled in the art may better understand how the present invention can be practiced, the following examples are given by way of illustration and not by way of limitation. All parts and percents referred to herein are by weight, and all viscosities measured at 25° C., unless otherwise specified. All Dissipation Factors and all Dielectric Constants were measured according to ASTM Test D-924, and all Volume Resistivities were measured according to ASTM Test D-257, unless otherwise specified.

EXAMPLE 1

A mixture of 328 g. (2.0 moles) of

$ClCH_2CH_2CH_2SiCH_3Cl_2$ and 32 g. (0.2 mole) of $(CH_3)_3SiCl$ was added to 2000 ml. of crushed ice with vigorous stirring over a period of 5 to 10 minutes. The reaction mixture was stirred for an additional 5 minutes before the organic layer was dissolved in ether and separated. The ether was removed to give a clear fluid which turned cloudy on standing. The fluid was dissolved in an equal volume of toluene, then three drops of $F_3CSO_3H$ were added and the solution was heated to reflux under a Dean-Stark trap for 18 hours. The reaction mixture was then washed with dilute aqueous sodium carbonate and then stripped to 220° C. at 0.6 mm. of mercury pressure. The product was purified by adding 5 g. of Nuchar to the fluid which was then stirred at 150° C. for 5 hours, and then at 25° C. for an additional 18 hours before being filtered through Super-Cel, then alumina (48–100 mesh previously activated by heating 24 hours at 500° F.) and finally through Super-Cel again. The resulting product, $(CH_3)_3SiO[ClCH_2CH_2CH_2(CH_3)SiO]_xSi(CH_3)_3$, had a viscosity of 163 cs. and a refractive index $D_0^{25}$ of 1.4654. This product contained about 94 mole percent of the chloropropylmethylsiloxane units.

EXAMPLE 2

A mixture of 307 g. (1.6 moles) of

$ClCH_2CH_2CH_2SiCH_3Cl_2$, 310 g. (2.4 moles) of $(CH_3)_2SiCl_2$ and 22 g. (0.2 mole) of $(CH_3)_3SiCl$ was added to 3000 ml. of crushed ice with vigorous stirring during a period of 5 to 6 minutes. The cold reaction mixture was stirred an additional 5 minutes and then 400 ml. of toluene added. The organic layer was separated, washed twice with water, diluted with 600 ml. of toluene, 6 drops of $F_3CSO_3H$ added, and then heated to reflux for 18 hours under a Dean-Stark trap. The fluid was then stripped to 200° C. at 0.3 mm. of mercury pressure. The product was then purified following the procedure used in the preceding example. The resulting product,

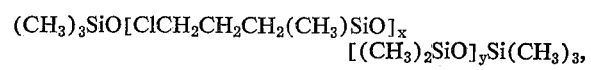
$(CH_3)_3SiO[ClCH_2CH_2CH_2(CH_3)SiO]_x[(CH_3)_2SiO]_ySi(CH_3)_3$, had a viscosity of 133 cs. This product contained about 37 mole percent chloropropylmethylsiloxane units.

EXAMPLE 3

The dissipation factor and dielectric constants of the products prepared in Example 1 and 2 were measured and the results set forth in the table below. Also included in the table for purposes of comparison are typical values which polydimethylsiloxanes,

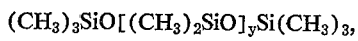
$(CH_3)_3SiO[(CH_3)_2SiO]_ySi(CH_3)_3$, having viscosities greater than 50 cs. exhibit.

| Dielectric fluid | Dissipation factor | | Dielectric constant | |
|---|---|---|---|---|
| | 100 hertz | 1,000 hertz | 100 hertz | 1,000 hertz |
| Polydimethylsiloxane | *<1×10⁻⁵ | *<1×10⁻⁵ | 2.7 | 2.7 |
| Example 2 | 2.8×10⁻⁴ | 3×10⁻⁵ | 5.069 | 5.065 |
| Example 1 | 3.6×10⁻² | 4.3×10⁻³ | 6.991 | 6.959 |

*Limit of the test equipment.

EXAMPLE 4

To a 12 liter, 3-necked flask equipped with a mechanical stirrer, thermometer, reflux condenser and addition funnel there was added 3100 ml. of water and 485 ml. of toluene. The funnel was charged with 1419 g. (11 moles) of $(CH_3)_2SiCl_2$, 259 g. (1.22 moles) of $ClCH_2CH_2CH_2SiCl_3$ and 485 ml. of toluene. The funnel contents were added to the stirred flask contents over a period of 15 to 20 minutes causing the temperature of the hydrolysis mixture to rise to 90° C. Some refluxing was noted and the rapid evolution of gaseous HCl was observed. The mixture was allowed to cool and separate. The organic phase was removed and washed with dilute aqueous sodium carbonate. Again the organic phase was separated and then it was dried over anhydrous sodium sulfate. Filtration through Super-Cel gave 1820 ml. of product which represents a yield of about 95%.

A 400 ml. portion of the above prepared cohydrolyzate, 400 ml. of toluene, and 1.5 ml. of a 50% aqueous KOH solution were placed in a 2 liter, 3-necked flask equipped with a reflux condenser atop a Dean-Stark trap, and a mechanical stirrer. The stirred flask contents were heated at reflux for 8 hours. Then the still basic reaction mixture was treated with 30 ml. of $(CH_3)_3SiCl$ and filtered. The filtrate was freed of most of the solvent on a Rinco evaporator. The 177 g. of residue were stripped at 200° C. at 0.3 mm. of mercury pressure to obtain 147 g. of product, about 73% of the theoretical yield. Filtration through Super-Cel gave a clear fluid having a viscosity of 108 cs. Analysis showed the product to contain 5.20% chlorine. This product contains about 11.8 mole percent of chloropropylsilsesquioxane units. This fluid was then stirred for 18 hours with a quantity of activated alumina (80–200 mesh previously activated by heating 24 hours at 500° F.) equal to one-fourth the volume of the fluid. The fluid was again filtered through Super-Cel and then its electrical properties measured. This fluid is designated "A" in the following table where its properties are set forth. Also included in the table are other similar siloxanes containing varying amounts of chloropropylsilsesquioxane units.

| Dielectric fluid | Mole percent $Cl(CH_2)_3SiO_{3/2}$ | Viscosity (cs.) | Dielectric constant (100 hertz) | Dissipation factor (100 hertz) |
|---|---|---|---|---|
| A | 11.8 | 108 | 3.791 | 0.00029 |
| B | 12.2 | 324 | 3.755 | 0.00046 |
| C | 12.5 | 82.6 | 3.544 | 0.00211 |
| D | 13.0 | 62.5 | 3.857 | 0.00098 |
| E | 20.2 | 211 | 4.368 | 0.00406 |
| F | 21.8 | 124 | 4.372 | 0.01147 |
| G | 22.3 | 338 | 4.278 | 0.00162 |
| H | 28.0 | 685 | 4.494 | 0.00538 |
| I | 41.2 | 914 | *5.455 | *0.02958 |
| J | 41.5 | 2,127 | 5.457 | 0.01097 |

*1,000 hertz.

EXAMPLE 5

When the fluids of the preceding example are used as dielectric fluids to impregnate a capacitor or to fill a transformer, they perform very well.

EXAMPLE 6

To a 3 liter, 3-necked round bottom flask equipped with a mechanical stirrer, thermometer, reflux condenser and addition funnel there was added 810 g. of cold tap water and 84 g. of toluene. The funnel was charged with 344.5 g. (1.675 moles) of $$ClCH_2CH(CH_3)CH_2Si(CH_3)Cl_2,$$

400 g. (3.1 moles) of $(CH_3)_2SiCl_2$, 24.5 g. (0.22 mole) of $(CH_3)_3SiCl$ and 84 g. of toluene. The funnel contents were added to the stirred flash contents over a period of 111minutes keeping the pot temperature below 35° C. After addition was complete the mixture was allowed to cool and separate. The organic phase was removed and washed with tap water until neutral, and then azeotroped to dryness. To 666 g. of the hydrolyzate containing 75% non-volatile materials there was added 1.5 ml. of $$F_3CSO_3H$$

The mixture was heated at reflux (156° C.) for 8 hours taking off water. After the 8 hours reflux the material was washed with tap water until neutral. The residue was then stripped to 204° C. at 0.45 mm. of mercury pressure. The fluid was filtered, and than ½ weight percent of calcinated calcium oxide and ½ weight percent dried Nuchar (previously dried 24 hours at 350° C.) were added and the mixture heated at 100° C. for 4 hours. The mixture was cooled and then filtered, first through a medium frit filter and then through dried Super-Cel. About a 60% yield of the product was obtained which contained about 33.2 mole percent of $$ClCH_2CH(CH_3)CH_2\underset{|}{\overset{CH_3}{Si}}O$$

units. This siloxane had a viscosity of 177 cs., a viscosity index of 0.708, a specific gravity of 1.048, a refractive index of 1.4393, and contained 0.058% hydroxyl groups. The electrical properties of this siloxane fluid were measured and it was found to have a dielectric constant of 4.8459 at both 100 and 1000 hertz, a dissipation factor of 0.00127 at 100 hertz and 0.00016 at 1000 hertz, and a volume resistivity of $8.4 \times 10^{12}$.

EXAMPLE 7

When siloxane fluids containing the mole percents of the units set forth below are prepared they are useful as dielectric fluids in capacitors and transformers.

(A)  5% $(CH_3)_3SiO_{1/2}$

35% $Cl(CH_2)_6\underset{|}{\overset{CH_3}{Si}}O$

60% $(CH_3)_2SiO$ (B)  10% $(ClCH_2CH_2CH_2)_3SiO_{1/2}$

90% $CH_3(C_2H_5)SiO$ (C)  5% $(ClCH_2CH_2CH_2)_2(CH_3)SiO_{1/2}$

90% $(CH_3)_2SiO$

5% $CH_3(C_{12}H_{25})SiO$ (D)  7% $ClCH_2CH_2CH_2(CH_3)_2SiO_{1/2}$

90% $(CH_3)_2SiO$

2% $CH_3(C_6H_{13})SiO$

1% $SiO_{4/2}$ (E)  5% $(CH_3)_3SiO_{1/2}$

85% $(CH_3)_2SiO$

5% $(ClCH_2CH_2CH_2)_2SiO$

5% $CH_3SiO_{3/2}$ (F)  $[ClCH_2CH_2CH_2(CH_3)SiO]_4$ (100% cyclic tetramer)

(G)  5% $(CH_3)_3SiO_{1/2}$

94% $(CH_3)_2SiO$

1% $ClCH_2CH(CH_3)CH_2SiO_{3/2}$

EXAMPLE 8

A 5 liter 3-necked flask was charged with 1814 ml. of water. It was fitted with a mechanical stirrer, reflux condenser and an addition funnel. The funnel was charged with a solution of 742 g. (3.5 moles) of $$ClCH_2CH_2CH_2SiCl_3$$

and 706 g. (6.5 moles) $(CH_3)_3SiCl$. The funnel solution was added during 45 minutes to the stirred flask contents. The temperature was maintained below 45° C. The reaction mixture was stirred for an hour after completion of the addition. The organic phase was separated from the aqueous phase and washed with water until it was neutral. The fluid was placed in a 2 liter 3-necked flask fitted with a mechanical stirrer and a reflux condenser over a Dean-Stark trap. The stirred fluid was heated and water was collected in the Dean-Stark trap. To the fluid, 887 ml., in the flask was added 108 ml. of toluene and 15 ml. of 50% aqueous KOH. Heat was applied to reflux for 12 hours (150° C.); water was collected in the Dean-Stark trap. Sixteen ml. of water were collected. The addition of basic potassium hydroxide condensation catalyst (10 ml.) and heating to reflux for 4 hours did not result in the collection of more water. The base was neutralized with $(CH_3)_3SiCl$ and the fluid was stripped to 150° C. at 30 mm. of mercury pressure. The fluid was then treated with 1% CaO and 1% Nuchar at 125° C. for 4 hours (CaO and Nuchar dried as in previous examples). The treated fluid was filtered through dried Super-Cel to give a 63% yield of a 32 cs. fluid. The fluid contained 310 p.p.m. hydroxyl and 13.1% Cl (approximately 36.4 mole percent $ClCH_2CH_2CH_2SiO_{3/2}$). The fluid had a dielectric constant of 4.4621 at both 100 and 1000 Hertz, a dissipation factor of 0.00271 at 100 Hertz and 0.00032 at 1000 Hertz, and a volume resistivity of $1.2 \times 10^{13}$ ohm-cm.

That which is claimed is:

1. In an electrical device containing a dielectric fluid, the improvement comprising employing as the dielectric fluid a siloxane which consists essentially of from 1 to 100 mole percent $$R_nR'_mSiO_{\frac{4-(m+n)}{2}}$$

siloxane units wherein $n$ has an average value of from 1 to 3, $m$ has an average value of from 0 to 2, the sum of $m+n$ being from 1 to 3, R is a monochloroalkyl radical containing from 3 to 6 carbon atoms, and R' is an alkyl radical containing from 1 to 12 carbon atoms, and from 0 to 99 mole percent $$R''_xSiO_{\frac{4-x}{2}}$$

siloxane units wherein $x$ has an average value of from 0 to 3, and R'' is an alkyl radical containing from 1 to 12 carbon atoms.

2. An electrical device as defined in claim 1 wherein the dielectric fluid has a viscosity in the range of 5 to 500 cs. at 25° C.

3. An electrical device as defined in claim 2 which is a transformer.

4. A transformer as defined in claim 3 wherein in the siloxane R contains 3 or 4 carbon atoms, R' contains from 1 to 6 carbon atoms, and R'' contains from 1 to 6 carbon atoms.

5. A transformer as defined in claim 4 wherein in the siloxane R is a chloropropyl radical, R' is a methyl radical and R'' is a methyl radical.

6. A transformer as defined in claim 5 wherein the siloxane consists essentially of $(CH_3)_3SiO_{1/2}$ and $$ClCH_2CH_2CH_2(CH_3)SiO$$

units.

7. A transformer as defined in claim 5 wherein the siloxane consists essentially of $(CH_3)_3SiO_{1/2}$, $$ClCH_2CH_2CH_2(CH_3)SiO$$

and $(CH_3)_2SiO$ units.

8. A transformer as defined in claim 5 wherein the siloxane consists essentially of $(CH_3)_3SiO_{1/2}$, $(CH_3)_2SiO$ and $ClCH_2CH_2CH_2SiO_{3/2}$ units.

9. A transformer as defined in claim 5 wherein the siloxane consists essentially of $(CH_3)_3SiO_{1/2}$ and $$ClCH_2CH_2CH_2SiO_{3/2}$$

units.

10. An electrical device as defined in claim 2 which is a capacitor.

11. A capacitor as defined in claim 10 wherein in the siloxane R contains 3 or 4 carbon atoms, R' contains from 1 to 6 carbon atoms, and R" contains from 1 to 6 carbon atoms.

12. A capacitor as defined in claim 11 wherein in the siloxane R is a chloropropyl radical, R' is a methyl radical and R" is a methyl radical.

13. A capacitor as defined in claim 12 wherein the siloxane consists essentially of $(CH_3)_3SiO_{1/2}$ and $$ClCH_2CH_2CH_2(CH_3)SiO$$

units.

14. A capacitor as defined in claim 12 wherein the siloxane consists essentially of $(CH_3)_3SiO_{1/2}$, $$ClCH_2CH_2CH_2(CH_3)SiO$$

and $(CH_3)_2SiO$ units.

15. A capacitor as defined in claim 12 wherein the siloxane consists essentially of $(CH_3)_3SiO_{1/2}$, $(CH_3)_2SiO$ and $ClCH_2CH_2CH_2SiO_{3/2}$ units.

16. A capacitor as defined in claim 12 wherein the siloxane consists essentially of $(CH_3)_3SiO_{1/2}$ and $$ClCH_2CH_2CH_2SiO_{3/2}$$

units.

References Cited
UNITED STATES PATENTS

| | | | |
|---|---|---|---|
| 2,758,126 | 8/1956 | Goldschmidt et al. | 260—448.8 A |
| 2,776,307 | 1/1957 | Abbott et al. | 260—448.8 A |
| 2,848,425 | 8/1958 | Olson et al. | 260—448.8 A X |
| 3,466,314 | 9/1969 | Moedritzer et al. | 252—66 X |
| 3,696,137 | 10/1972 | Clark et al. | 252—66 X |
| 3,715,639 | 2/1973 | Gaines et al. | 174—17 LF X |

LELAND A. SEBASTIAN, Primary Examiner

P. A. NELSON, Assistant Examiner

U.S. Cl. X.R.

174—17 LF; 252—66; 260—448.8 A